Oct. 6, 1964   A. C. LAVANCHY   3,152,078
STATIONARY-WALLED CENTRIFUGE
Original Filed Jan. 20, 1960   2 Sheets-Sheet 1

INVENTOR.
ANDRE C. LAVANCHY
BY Hugo G. Kumman
ATTORNEY

Oct. 6, 1964     A. C. LAVANCHY     3,152,078
STATIONARY-WALLED CENTRIFUGE
Original Filed Jan. 20, 1960     2 Sheets-Sheet 2
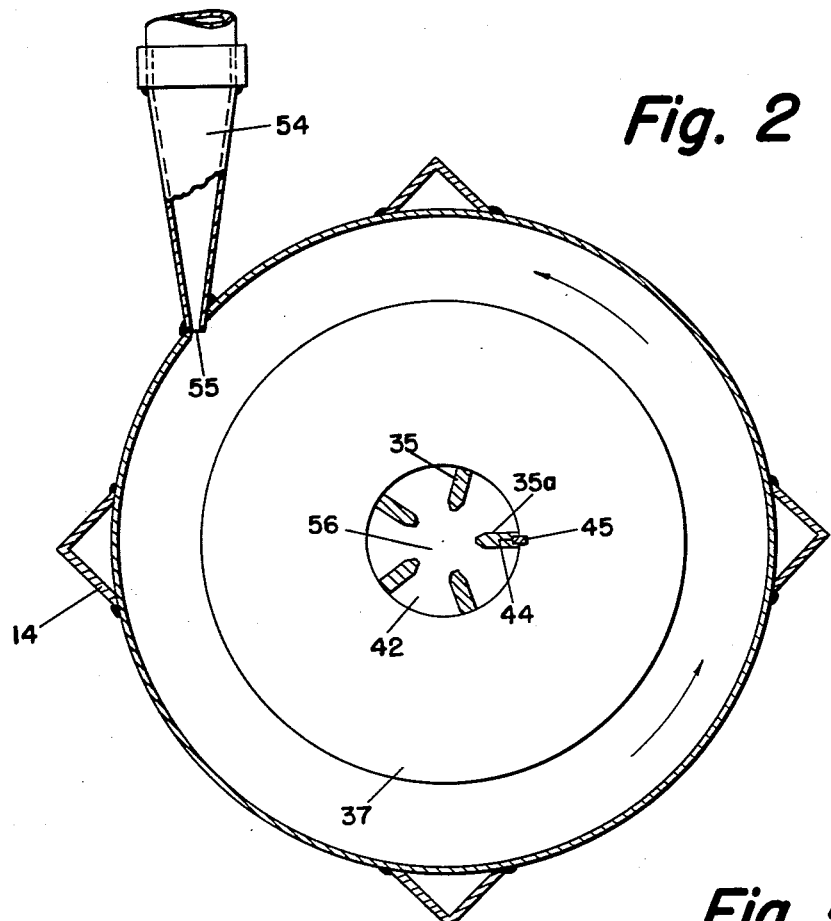
Fig. 2
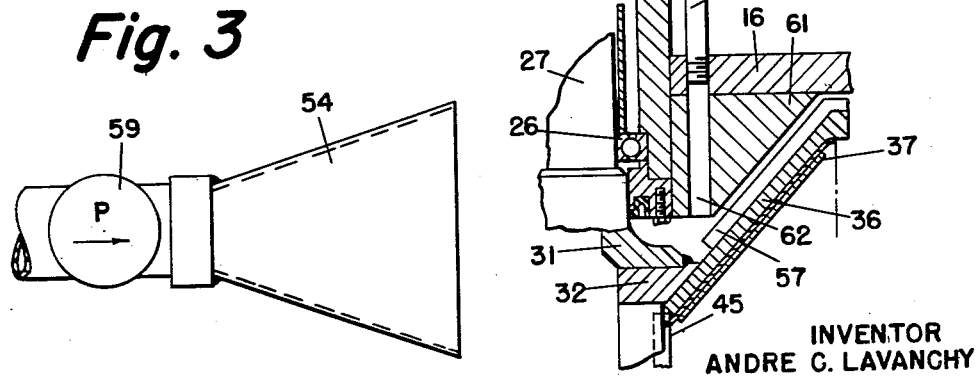
Fig. 3
Fig. 4
INVENTOR
ANDRE C. LAVANCHY
BY Hugo C. Kemmann
ATTORNEY United States Patent Office 3,152,078
Patented Oct. 6, 1964

3,152,078
STATIONARY-WALLED CENTRIFUGE
Andre C. Lavanchy, Devon, Pa., assignor to Pennsalt Chemicals Corporation, a corporation of Pennsylvania
Continuation of application Ser. No. 3,532, Jan. 20, 1960. This application Mar. 14, 1963, Ser. No. 265,289
1 Claim. (Cl. 210—297)

This invention pertains generally to the separation of phases, and more particularly to the separation of liquid phases of different densities, with or without the presence of solids.

This application constitutes a continuation application of my co-pending application Serial Number 3,532, filed January 20, 1960, and now abandoned.

The prior art is replete with all manner of processes and apparatus for the separation of phases occurring in admixtures whether of solids, liquids and/or gases. There still remains, however, an unsatisfied demand in certain fields for a process and apparatus of simple construction and operation, capable of being produced at relatively low cost, and capable of making clean separations rapidly under conditions of high volume throughput. Since one such field is that of removing water (which may or may not contain salt) and/or sand from crude petroleum oil, the invention will be more particularly described in connection therewith, it being understood that this is by way of illustration and not of limitation.

In the search for a device capable of meeting the above-mentioned qualifications, the cyclone separator suggests itself since it is a simple and rugged apparatus which can be operated for long periods of time with very little supervision or maintenance requirements. The cyclone separator may be made to function satisfactorily in many instances for the separation of a solid phase from a fluid phase whether the latter is a gas or a liquid. Cyclone separators, however, are not, in general, suitable for the separation of liquid phases from each other, a separation which is involved in the removal of water from crude petroleum oil. The centrifugal separator, on the other hand, may be made to function excellently for the latter purpose, even in the presence of solids, and various types are available for the purpose. A centrifugal separator, however, is a device having a rotating bowl of considerable mass, and its fabrication involves considerable expense, not only from the standpoint of materials suitable for the purpose, but also of obtaining proper balance. Centrifuge rotors must be precision made of materials of high tensile strength and must be precision balanced, with the result that cost runs into a relatively high figure.

In seeking a solution to the long-felt want for a process and apparatus capable of meeting the requirements initially set forth above, the applicant has proceeded by the direct application of centrifugal force to the mixture in a main zone of separation, e.g. by flowing the same from the periphery toward the center of a revolving disc stack, while feeding the mixture to the periphery of the main zone of separation from a preliminary separation zone which takes the form of a revolving annulus of feed mixture surrounding and contiguous with the main zone of separation, and which is confined outwardly by a stationary shell.

Further features of the invention will become apparent to persons skilled in the art as the description proceeds in connection with the accompanying drawings in which:

FIGURE 2 is a section taken on line 2—2 of FIGURE 1;

FIGURE 3 is a view of a tangential feed spout; and

FIGURE 4 is an elevation shown broken illustrating another embodiment.

Figure 1:
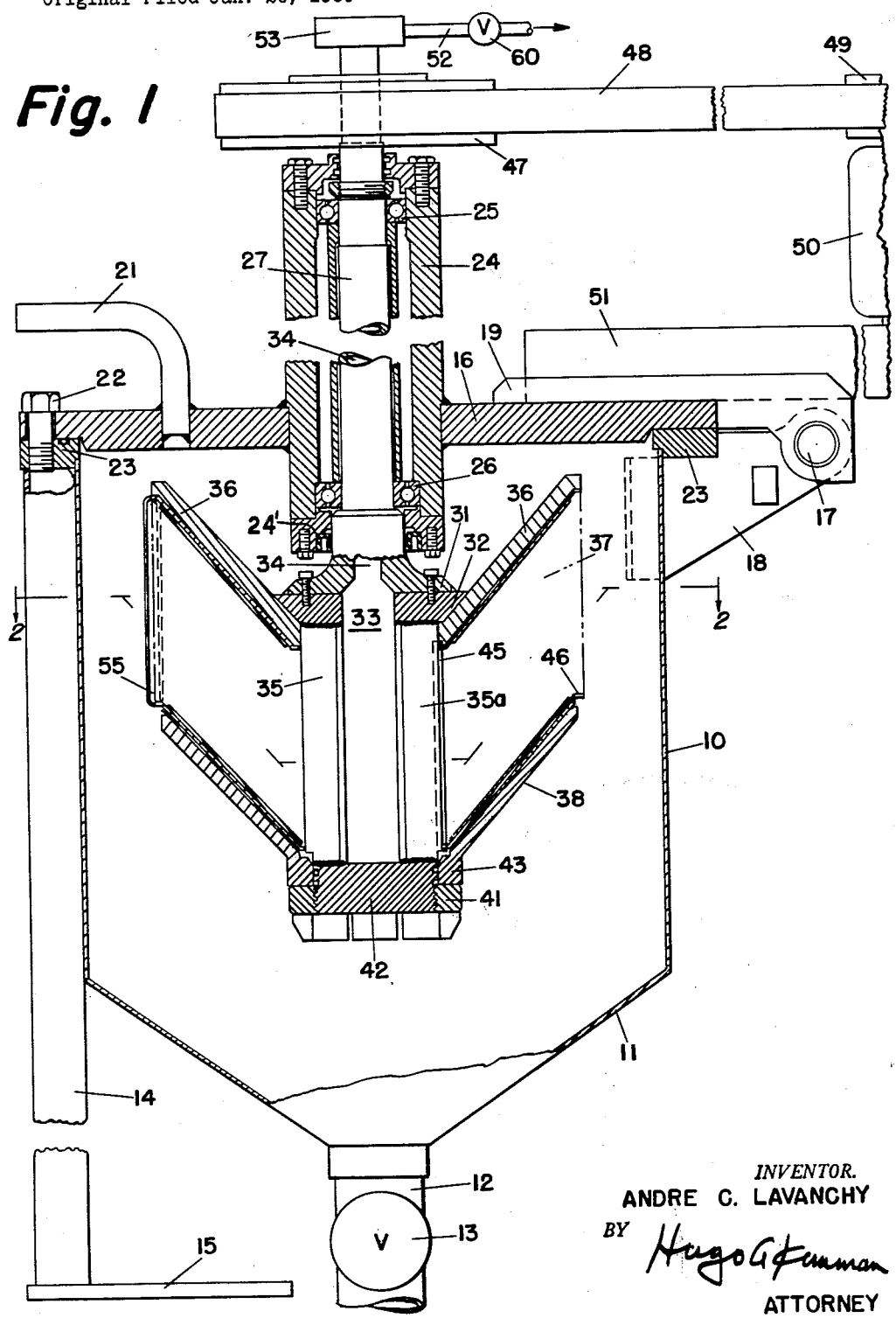
FIGURE 1 is an elevation largely in section of an embodiment of the invention.

Referring now more particularly to the embodiment of FIGURES 1 to 3, at 10 is shown a stationary casing having a frusto-conical lower portion 11 with an outlet 12 illustrated as controlled by a valve 13.

Casing 10 is illustrated as being supported in a vertical position by a foot 14 having a foot 15, post 14 being secured to the side of casing 10 by any suitable means, such as welding. It will be understood that additional posts 14 may be provided in circumferentially spaced relationship around casing 10, if desired.

Casing 10 is shown provided with a top 16 hinged to casing 10 as illustrated at 17. One arm 18 of hinge 17 is secured to the side of casing 10, and the other arm 19 of hinge 17 is secured to the upper face of top 16, in each instance such as by welding.

Top 16 is illustrated as having a handle 21 for raising and lowering top 16 about hinge 17, and as being secured in closed position by means of screw 22 which engages annulus 23 positioned around and secured to the top of casing 10, e.g. by welding.

Secured to top 16 centrally thereof, and projecting both above and below top 16, is a tubular member 24 within which is supported and journaled, such as by bearings 25 and 26, a tubular shaft 27. As shown an annular sealing means 24' is disposed about the shaft 27 and secured in the lower end of the tubular member 24.

The lower en dof shaft 27 is provided with a flange 31 to which is attached a bevelled anulus 32 by any suitable means, such as illustrated, annulus 32 being provided with a central channel 33 in communication with central channel 34 of shaft 27.

Secured to, such as by welding, and projecting downwardly from annulus 32 are a plurality of circumferentially spaced ribs 35 about which are positioned an upper frusto-conical end member 36, a disc stack 37, and a lower frusto-conical member 38, all of which are held in position by nut 41 which engages cooperating threads on member 42 secured, such as by welding, to the bottom ends of ribs 35, frusto-conical member 38 being provided with a collar 43 for engagement by nut 41 in compressing the parts together.

One of the ribs, i.e. rib 35a, is provided with a longitudinal slot 44 in which is positioned key 45 which projects outwardly into slots in the inner edges of spaced discs 46 of disc stack 37 for disc orientation purposes. Similar slots may be provided in the inneredges of frusto-conical members 36 and 38 for engagement by key 45, if desired.

The upper end of shaft 27 projects beyond tubular member 24, and as shown is provided with a pulley 47 engaged by belt 48 which in turn engages a pulley 49 on motor 50. As illustrated, motor 50 is mounted on a support 51 secured, such as by welding, to top 16.

A liquid flow connection is made between stationary effluent conduit 52 and the top of hollow shaft 27 through a liquid sealing connection 53 which may be of any desired design and construction, several of which are well known in the art. Valve 60 may be provided for flow control purposes, if desired.

The mixture to be separated is fed into casing 10 tangentially, and preferably in line with the vertical dimension of the periphery of disc stack 37, through feed spout 54 which is provided with a flat longitudinal feed opening as illustrated at 55 in FIGURE 1.

In operation, the mixture to be separated is pumped into casing 10 through feed spout 54 under velocity conditions to provide a rotating annulus of feed mixture in contact with the outer periphery of disc stack 37 over substantially its entire vertical dimension at its periphery. Any suitable means may be employed for imparting the desired velocity conditions in the feed mixture, such as a relatively high volume, high pressure pump, illustrated at 59.

Simultaneously with the feeding of the feed mixture into casing 10 through feed spout 54, disc stack 37 is rotated by means of motor 50 in the same rotational direction, and preferably at substantially the same angular velocity, e.g. within practical approximation, as that imparted by the feed mechanism to the annulus of feed mixture, such direction being counterclockwise as seen in FIGURE 2.

Due to the rotation of the annulus of feed mixture in casing 10 in the space around the periphery of disc stack 37, relatively large particles of solids and/or large globules of heavier phase liquid, if present, are thrown outwardly by centrifugal force and are deposited on the inner surface of casing 10, in the immediate vicinity of which the rotation is at a minimum, and down which they slide and collect in the bottom thereof. Simultaneously with such separation, feed mixture enters disc stack 37 and flows inwardly through the thin separating spaces between spaced discs 46. Under the influence of centrifugal force generated by the rotation of disc stack 37, heavier liquid phase and any heavier solids present are separated from the lighter liquid phase in said thin separating spaces, and move outwardly from disc stack 37, being deposited on the inner surface of casing 10 down which they slide for collection in the bottom thereof. Should any solids be present that are lighter than the lighter liquid phase, these are carried off floating on the lighter liquid phase.

Lighter liquid phase, separated from heavier liquid phase and solids in disc stack 37, continues to flow inwardly and enters space 56 located centrally of ribs 35. From space 56 lighter liquid phase flows upwardly through channels 33 and 34 and from the machine through stationary conduit 52.

Heavier liquid phase and solids are permitted to accumulate in the frusto-conical lower portion 11 of casing 10, and are removed therefrom as desired or required, preferably in a manner to maintain a more or less uniform level between separated heavier liquid phase and the incoming feed mixture.

It will be noted that member 42 is imperforate as are frusto-conical members 36 and 38 which confines the entrance of feed mixture into disc stack 37 to the area surrounding the outer periphery of discs 46.

It will, of course, be understood that the pressure on the feed mixture entering casing 10 through feed spout 54 is sufficient to deliver separated lighter liquid phase to conduit 52 at the desired outlet pressure.

For cleaning purposes, both of disc stack 37 and the interior of casing 10, cap screw or screws 22 may be removed, and top 16 together with attached mechanism swung about hinge 17 to bring the disc stack together with associated mechanism up out of casing 10. It will be noted that since support 51 for motor 50 is attached to top 16, the foregoing may be accomplished without distributing the driving connection between motor 50 and shaft 27.

The following run made for purposes of separating water and sand from petroleum oil is given by way of illustration and not of limitation.

A mixture containing approximately 80% oil, 20% water, and sand was fed to a separator of the type shown in FIGURES 1 to 3 at the rate of 1200 gallons per hour. The interior of the cylindrical portion of the casing had a diameter of approximately 15", and the disc stack had a diameter of approximately 11". The oil taken off as the lighter liquid phase was analyzed for water content which was found to be less than 0.1%. It was completely free of sand. The oil carried off in the aqueous phase was recoverable by recycling, preferably after removal of the major part of the water and the sand by gravity settling.

Another embodiment of the invention is illustrated in FIGURE 4 in which like parts bear the same numerals as employed in FIGURES 1 to 3. In the embodiment of FIGURE 4, frusto-conical member 36 is provided on its upper face with one or a plurality of vanes 57, preferably with a plurality of such vanes spaced circumferentially. The attachment of vanes 57 to frusto-conical member 36 may be by any suitable means, such as welding.

Feed pipe 58 for feed mixture passes down through top 16 and an annular frusto-conical filler member 61 attached to the underside of top 16, the lower end 62 of feed pipe 58 terminating for feed purposes in any suitable position relative to member 36 and vanes 57, e.g. as illustrated.

In operation of the embodiment shown in FIGURE 4, feed mixture flows down through pipe 58 and is deposited onto the upper side of member 36 where it is engaged by vanes 57 and caused to flow outwardly with rotation at the same angular velocity as that of disc stack 37. The feed mixture acquires, due to the extension of vanes 57 outwardly beyond disc stack 37, a tangential velocity at the periphery of disc stack 37 which is somewhat higher than that of the disc stack. The feed mixture, upon leaving the periphery of member 36, flows downwardly, under pump pressure generated by vanes 57, about the periphery of disc stack 37 to enter the disc stack in substantially the same manner as previously described in connection with FIGURES 1 to 3. The rotation imparted to the feed mixture by vanes 57 maintains the annular flow of feed mixture in the space outwardly from disc stack 37 the same as in the embodiment previously described, and the pressure developed by the rotation of vanes 57 is more than sufficient to deliver separated lighter liquid phase to outlet conduit 52.

While the embodiment of FIGURES 1 to 3 and that of FIGURE 4 have been described as separate, it will be understood by persons skilled in the art, upon becoming familiar with this invention, that both embodiments may be incorporated into a single apparatus, if desired, and that various other variations are possible. It, therefore, is to be understood that the above particular description is by way of illustration and not of limitation, and that changes, omissions, additions, substitutions and/or other modifications may be made without departing from the spirit of the invention. Accordingly it is intended that the patent shall cover by suitable expression in the claims the various features of patentable novelty that reside in the invention.

I claim:

For the separation of liquid components of different densities in a feed mixture, an apparatus comprising:

(a) a closed stationary casing comprising a peripheral wall having a frusto-conical lower portion, and a flat top cover element, the top cover element being hingedly mounted on the wall and normally secured in closing relation to the wall, an elongated tubular member having an upper end and a lower end and penetrating through and secured centrally of said top cover element, (b) a rotor comprising a hollow drive shaft having an upper end and a closed lower end, a stack of spaced frusto-conical discs mounted on the lower end of the shaft, radial ribs being formed on the shaft inside the disc stack, the upper end of the shaft extending up through the tubular element, the rotor having its disc stack in the casing, the rotor having openings between the discs from its margin, between the ribs and into the inside of the hollow shaft, the upper end of the shaft comprising an outlet for discharge of a component of lesser density, said disc stack having a radius less than that of the inside surface of the wall and providing a free annular space extending between the outer margin of the stack and the inside surface of the wall, (c) bearing means comprising a pair of spaced bearing units mounted in said tubular member adjacent the opposite ends thereof respectively and engaging the shaft to rotatably mount the rotor, (d) sealing means disposed about the shaft and secured to the lower end of the tubular member, (e) drive means to drive the rotor, said drive means being operatively connected with said rotor shaft, (f) means for introducing the feed mixture under pressure to said annular space in movement in the same direction of rotation and at an angular velocity substantially the same as the rotor to cooperate in promoting a centrifugal separation, said last-named means comprising a conduit secured to the casing and having an inlet opening into the free annular space, the inlet opening facing to one side of the rotor, (g) an outlet in the stationary casing below the frusto-conical lower portion for discharge from the casing of a component of greater density, and (h) liquid flow-controlling means on at least one of said outlets.

References Cited in the file of this patent

UNITED STATES PATENTS

| | | |
|---|---|---|
| 204,124 | Barrett et al. | May 28, 1878 |
| 1,718,871 | Nordell | June 25, 1929 |
| 1,831,473 | Adams | Nov. 10, 1931 |
| 1,869,797 | Cleaver | Aug. 2, 1932 |
| 2,031,734 | Riebel et al. | Feb. 25, 1936 |
| 2,126,481 | Lapp et al. | Aug. 9, 1938 |
| 2,442,234 | Dunmire | May 25, 1948 |
| 2,447,330 | Grebmeier | Aug. 17, 1948 |
| 2,459,944 | Jones et al. | Jan. 25, 1949 |
| 2,557,622 | Trier | June 19, 1951 |
| 2,628,021 | Staaff | Feb. 10, 1953 |
| 2,641,363 | Chatain | June 9, 1953 |
| 2,678,133 | Thayer et al. | May 11, 1954 |
| 2,731,331 | Strezynski | Jan. 17, 1956 |
| 2,788,937 | Weiland | Apr. 16, 1957 |
| 2,881,974 | Ruf | Apr. 14, 1959 |
| 2,941,872 | Pilo et al. | June 21, 1960 |
| 2,968,401 | Sheldon | Jan. 17, 1961 |
| 3,008,543 | Bourdale et al. | Nov. 14, 1961 |

FOREIGN PATENTS

| | | |
|---|---|---|
| 33,416 | France | Apr. 23, 1928 |
| | (1st addition to No. 620,108) | |
| 559,994 | France | June 27, 1923 |
| 652,310 | Germany | Oct. 30, 1937 |